2 Sheets—Sheet 1.

W. E. SERGEANT.

Millstone-Driver.

No. 7,980. Reissued Dec. 4, 1877.

Witnesses:
Will N. Dodge.
Donn P. Turtchell.

Inventor:
W. E. Sergeant
By his attys.
Dodgeson

N. PETERS, PHOTO-LITHOGRAPHER, WASHINGTON, D. C.

2 Sheets—Sheet 2.

W. E. SERGEANT.

Millstone-Driver.

No. 7,980. Reissued Dec. 4, 1877.

Witnesses:
Will M. Dodge.
Louis P. Twitchell.

Inventor:
W. E. Sergeant
By his attys.
Dodge & Son

N. PETERS, PHOTO-LITHOGRAPHER, WASHINGTON, D. C.

UNITED STATES PATENT OFFICE.

WELLS E. SERGEANT, OF MINNEAPOLIS, MINNESOTA.

IMPROVEMENT IN MILLSTONE-DRIVERS.

Specification forming part of Letters Patent No. 170,454, dated November 30, 1875; Reissue No. 7,980, dated December 4, 1877; application filed November 13, 1877.

*To all whom it may concern:*

Be it known that I, WELLS E. SERGEANT, formerly of Pine Island, Minnesota, but now of Minneapolis, in the county of Hennepin and State of Minnesota, have invented certain new and useful Improvements in Millstone-Drivers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to an improved means for transmitting motion from a mill-spindle to the grinding-stone sustained thereby, and at the same time permitting the stone to maintain a free and true balance, notwithstanding the vibration or irregularity of the spindle; and to this end the invention consists, mainly, in the employment of a transverse rock-shaft or driver, having at its opposite ends two bent or cranked arms; and, secondly, in a peculiar manner of mounting said shaft, and in a novel manner of mounting and operating a self-adjusting damsel-spindle.

Figure 1:
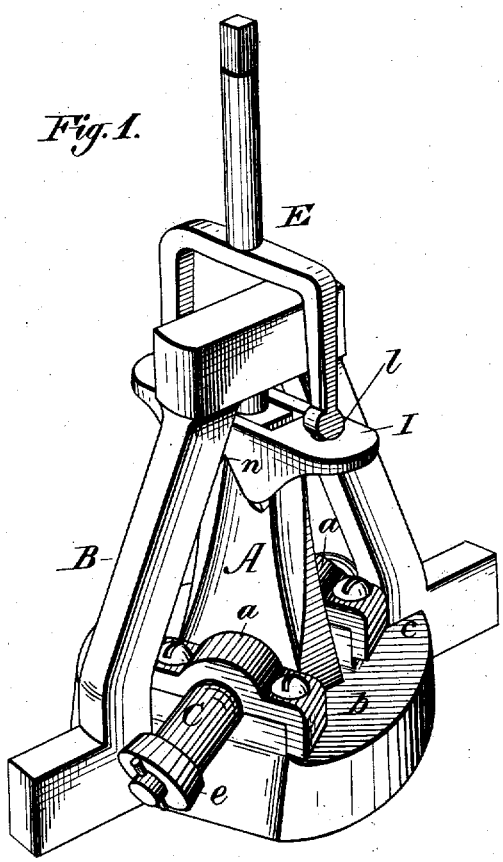
Figure 2:
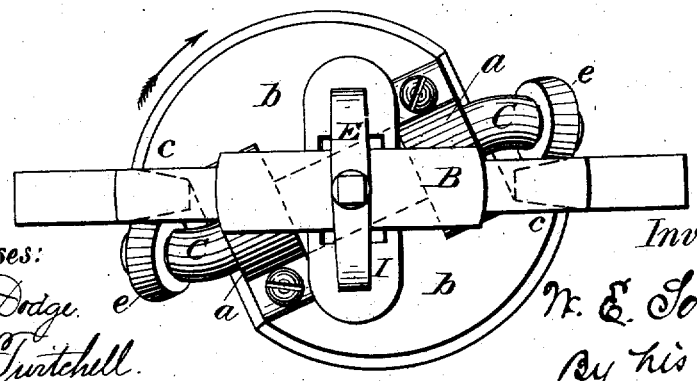
Figure 3:
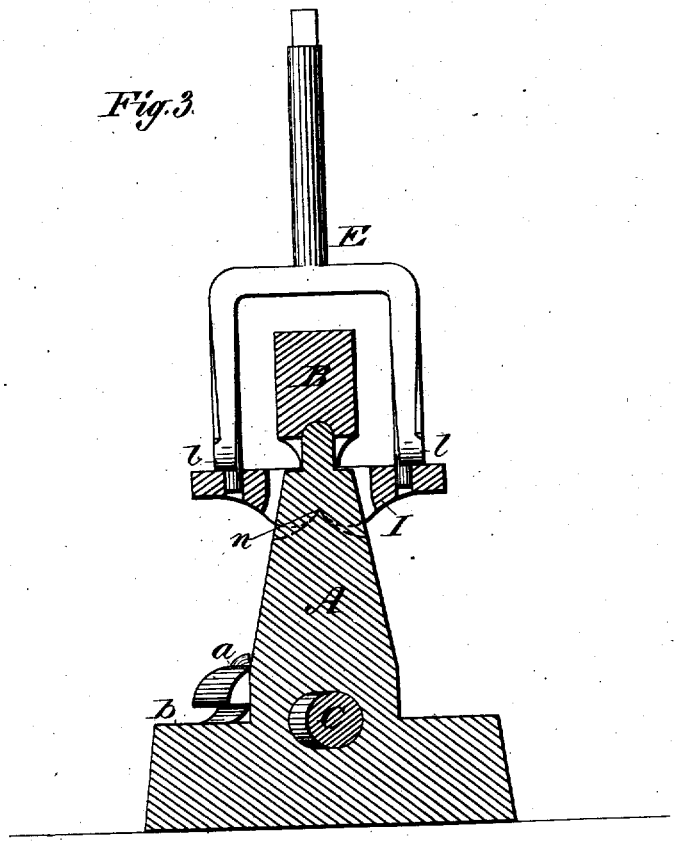
Figure 4:
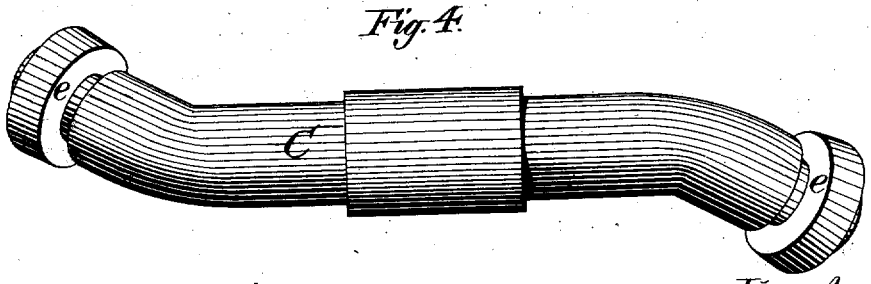

Figure 1 is a perspective view of my complete driving mechanism; Fig. 2, a top-plan view of the same; Fig. 3, a vertical transverse section of the same; Fig. 4, a plan view of the rock-shaft or driver detached.

In carrying out the main feature of my invention I provide a short shaft or driver, having at opposite ends two bent or cranked arms standing at an angle or inclination to its axis, and this shaft I mount between the usual bail and spindle in such manner that it will transmit motion from one to the other, and that as the relative position of said parts changes the shaft will rock and accommodate itself thereto without affecting the transmission of power.

The main feature of the invention is the cranked rock-shaft, arranged to communicate motion from the spindle to the stone and adjust itself to the changing position of the stone and spindle.

In the drawings, A represents the mill-spindle, or an upward continuation of the same, and B represents a bail intended to be secured in the eye of the millstone, as usual, and which may be of any ordinary construction. This bail is mounted at its center loosely on a vertical pivot or cock-head on the upper end of the spindle A, with its arms or ends extending downward on each side of the same, as usual.

C represents my rock-shaft or driver proper, having its two ends bent at an angle or inclination to its axis, and their extremities provided with rollers *e*, which may, however, be omitted, their purpose being merely to lessen the friction between the arms and the surfaces on which they act.

As shown in the drawing, the rock-shaft is arranged horizontally, with its axis in a plane passing through the center of the spindle, and with its ends in such position that their rollers will act against the respective arms of the bail, as shown. The body of the shaft, when arranged as shown, passes through and bears in the spindle A, but is also supported and held by bearings or boxes *a* secured upon a disk or enlargement, *b*, on the spindle A, as shown in Figs. 1 and 2. When the parts are thus arranged and the spindle A set in motion, it will carry the shaft C around horizontally, and the shaft, in turn, will cause the rotation of the bail and the stone mounted thereon.

The bail, being suspended loosely on the spindle, is free to tip and rock in all directions without reference to the spindle, so that the runner-stone thereon may at all times retain its parallelism with the bed-stone. As the tipping of the bail or spindle changes their relative positions the shaft rocks in its bearings and the arms swing in such manner as to maintain a direct connection between the spindle and driver, without causing the least cramping or binding of the parts or interfering in the slightest degree with their free movements.

It is obvious that the spindle, the bail, and the crank-shaft are the essential parts of the driving mechanism, and that they alone communicate the necessary motion to the stone.

In order, however, to render the mechanism more complete, I propose to provide the disk or enlargement with shoulders *c*, to bear against the bail on the opposite side from the rollers, as shown, for the purpose of limiting the rotation of the bail and preventing backlash.

The shaft C should be arranged to have a little end play in its bearings, and the rollers, which should be made slightly conical, should also have a little play endwise on the arms of the shaft. A small amount of play should be allowed the bail, between the rollers and the shoulders, in order to permit the parts to adjust themselves freely and without binding.

The bail C should be made of steel, or hardened, and be smooth at the points where the rollers *a* bear against it; and in case old bails be used they should have a piece of hardened steel secured to them for the rollers to work against. In like manner the rollers *e* should be made true, and be hardened, so as not to wear irregular or out of shape. The rollers *a* may be omitted, but not with as good results.

In order that the damsel-spindle E, used for driving a fan or shaking the shoe that feeds the grain to the stones, may in like manner run true, regardless of the driving-shaft, I connect it to the driver, as represented in the drawings. To this end I provide a cross-piece, I, which has an opening at its center, so as to permit it to sit astride of the stem A and rest loosely on V-shaped shoulders *n*, formed on the sides of the stem A, as shown in Figs. 1 and 3, it having corresponding-shaped notches in its under face, which notches are made broader at their open ends than the shoulders *n* are wide, so as to permit the cross-piece I to rock freely thereon. I then make the spindle E, with its lower end forked, so as to straddle the top of the bail B, and form on its lower ends journals, which fit into holes in the cross-piece I, as shown in Fig. 3. On each prong there is a rounded shoulder, *l*, as shown in Fig. 1, which bear upon the cross-piece and support the spindle, these rounded shoulders permitting it to rock at right angles to the plane in which the cross-piece itself rocks on its bearings *n*, thus forming a universal-joint connection between the driver and the spindle E. This construction permits the damsel shaft or spindle E to run steady and true at its upper end, regardless of the fact that the mill-spindle or driving-shaft may not be true or perpendicular, and thereby the irregular or wabbling movement so common in these spindles is entirely obviated.

Having thus described my invention, what I claim is—

1. The combination of a mill-spindle, a bail, and an intermediate rock-shaft, with inclined or cranked arms, arranged to transmit motion from the spindle to the bail.

2. In a millstone-driving mechanism, the combination of a spindle, A, a bail, B, and a transverse rock-shaft or driver, mounted in bearings in one of said parts, and provided with two inclined or crank arms to act upon the other of said parts, substantially as described.

3. A shaft or driver, C, provided with two inclined or cranked arms or ends, having rollers thereon, said shaft being constructed and adapted for use as a millstone-driver, substantially as shown.

4. The combination, substantially as shown, of a spindle, a bail suspended freely thereon, and an intermediate rocking-shaft or driver, with two radial or crank arms, arranged so that motion is transmitted through its arms and body from the spindle to the bail, and that the swinging of its arms will enable it to accommodate itself to the changing relation of the bail and spindle, and at the same time maintain its connection between them.

5. A millstone-driving mechanism, consisting of the spindle A, provided with the shoulders *c* and the shaft C, with or without the rollers *e* mounted thereon, in combination with the bail B, all constructed to operate substantially as described.

6. The spindle A, provided with the shoulders *n*, and the cross-bar I, arranged to rest and rock on the shoulders *n*, in combination with the forked spindle E, provided with the shoulders *l* and loosely connected to the bar I, all constructed and arranged to operate substantially as described.

WELLS E. SERGEANT.

Witnesses:

WILLIAM HOULISTON,

I. W. JOHNSON.